US012620241B2

(12) United States Patent
Han et al.

(10) Patent No.: US 12,620,241 B2
(45) Date of Patent: May 5, 2026

(54) DEVICE FOR DETECTING DRIVER BEHAVIOR USING DEEP LEARNING-BASED OBJECT CLASSIFICATION

(71) Applicant: KYUNGPOOK NATIONAL UNIVERSITY INDUSTRY-ACADEMIC COOPERATION FOUNDATION, Daegu (KR)

(72) Inventors: Dong Seog Han, Daegu (KR); Jaeho Seong, Daegu (KR); Youngjin Yoon, Busan (KR); Minwoo Yoo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 70 days.

(21) Appl. No.: 18/701,107

(22) PCT Filed: Oct. 7, 2022

(86) PCT No.: PCT/KR2022/015085
§ 371 (c)(1),
(2) Date: Sep. 12, 2024

(87) PCT Pub. No.: WO2023/063649
PCT Pub. Date: Apr. 20, 2023

(65) Prior Publication Data
US 2025/0200996 A1     Jun. 19, 2025

(30) Foreign Application Priority Data

Oct. 12, 2021     (KR) ........................ 10-2021-0134866

(51) Int. Cl.
*G06V 20/59* (2022.01)
*B60Q 9/00* (2006.01)
(Continued)

(52) U.S. Cl.
CPC ............. *G06V 20/597* (2022.01); *B60Q 9/00* (2013.01); *G06V 10/26* (2022.01); *G06V 10/30* (2022.01);
(Continued)

(58) Field of Classification Search
CPC ......... B60Q 9/00; B60W 40/09; B60W 50/14; G06F 18/00; G06N 3/08; G06V 10/14;
(Continued)

(56) References Cited

FOREIGN PATENT DOCUMENTS

CN          106709420 A      5/2017
JP          2017217472 A  *  12/2017  ............... A61B 5/11
(Continued)

OTHER PUBLICATIONS

Friberg, jesper. Detecting Background and Foreground from Video in Real-Time with a Moving Camera. Jan. 1, 2013. (Year: 2013).*

*Primary Examiner* — William C Vaughn, Jr.
*Assistant Examiner* — Astewaye Gettu Zewede
(74) *Attorney, Agent, or Firm* — Bridgeway IP Law Group, PLLC; Sang Ho Lee; Hyun Woo Shin

(57)                ABSTRACT

A driver behavior detection system using deep learning-based object classification includes: a frame inputting unit for receiving image frames; a downsampling unit for downsampling resolutions of a previous frame and a current frame of the image frames; an active image producing unit for utilizing brightness values by color of the downsampled previous and current frames to produce an active image; an active region extracting unit for applying a sliding window algorithm to the produced active image to extract an active region having the biggest window value among window
(Continued)

values; and a behavior detecting unit for applying an object classification algorithm to the extracted active region to classify and detect a driver's behavior.

5 Claims, 4 Drawing Sheets

(51) Int. Cl.
| | | |
|---|---|---|
| *G06V 10/26* | (2022.01) | |
| *G06V 10/30* | (2022.01) | |
| *G06V 10/32* | (2022.01) | |
| *G06V 10/764* | (2022.01) | |
| *H04N 7/18* | (2006.01) | |

(52) U.S. Cl.
CPC ............ *G06V 10/32* (2022.01); *G06V 10/764* (2022.01); *H04N 7/183* (2013.01)

(58) Field of Classification Search
CPC ........ G06V 10/26; G06V 10/30; G06V 10/32; G06V 10/764; G06V 10/82; G06V 20/59; G06V 20/597; H04N 7/183
USPC ........................................................ 348/148
See application file for complete search history.

(56) References Cited

FOREIGN PATENT DOCUMENTS

| | | | | | |
|---|---|---|---|---|---|
| KR | 10-2020-0049451 | A | | 5/2020 | |
| KR | 20200049451 | A | * | 5/2020 | .............. G06K 9/20 |
| KR | 10-2020-0124278 | A | | 11/2020 | |
| KR | 10-2021-0036955 | A | | 4/2021 | |
| KR | 10-2282730 | B1 | | 7/2021 | |

* cited by examiner

Non-application of smoothing

Application of smoothing

Previous frame (P)    R_P    G_P    B_P

Current frame (C)    R_C    G_C    B_C

DEVICE FOR DETECTING DRIVER BEHAVIOR USING DEEP LEARNING-BASED OBJECT CLASSIFICATION

BACKGROUND OF THE DISCLOSURE

Field of the Disclosure

The present disclosure relates to a driver behavior detection system using deep learning-based object classification, more specifically to a driver behavior detection system using deep learning-based object classification that is capable of detecting a driver's risky behaviors at a high speed, while a vehicle is being driven.

Background of the Related Art

A driver's behaviors such as smartphone use, smoking, food taking, and the like, while the driver is driving, fail to maintain his or her concentration while driving and thus cause car accidents.

A lot of drivers know that smartphone use while driving is less risky than drunk driving or drowsy driving, but according to a survey, it is found that an accident risk level of smartphone use while driving is similar to that of drunk driving.

Further, a forward attention percentage when a driver uses smartphone while driving is just 50.3%, which is 23 times higher risky than a blood alcohol content level of 0.1% while drunk driving according to study results, and therefore, the driver should notice the risk of the smartphone use while driving.

If the driver takes unusual behaviors while driving, further, it is hard for him or her to quickly handle unexpected risky situations, which cause car accidents.

To detect a driver's risky behaviors, as a result, there is suggested a deep learning object detection method for detecting a type and position of an object from an image. However, a deep learning object detection algorithm disadvantageously makes use of many operation resources. Actually, such a method is difficult to be applied to an embedded environment for a vehicle having limited operation resources.

Therefore, there is a need to develop a technology capable of detecting an object through a small number of operation resources.

A background technology of the present disclosure is disclosed in Korean Patent No. 10-2282730 (Issued on Jul. 29, 2021).

SUMMARY OF THE DISCLOSURE

Technical Problem

Accordingly, the present disclosure has been made in view of the above-mentioned problems occurring in the related art, and it is an object of the present disclosure to provide a driver behavior detection system using deep learning-based object classification that is capable of making use of the fact that a driver does not move well while driving, sensing the driver's behavior change from the brightness change between the frames imaged in real time, and applying a deep learning-based object classification algorithm to a region where the behavior change is sensed to detect the driver's behavior.

Technical Solution

To accomplish the above-mentioned objects, according to the present disclosure, there is provided a driver behavior detection system using deep learning-based object classification, including: a frame inputting unit for receiving image frames; a downsampling unit for downsampling resolutions of a previous frame and a current frame of the image frames; an active image producing unit for utilizing brightness values by color of the downsampled previous and current frames to produce an active image; an active region extracting unit for applying a sliding window algorithm to the produced active image to extract an active region having the biggest window value among window values; and a behavior detecting unit for applying an object classification algorithm to the extracted active region to classify and detect a driver's behavior.

According to the present disclosure, desirably, the frame inputting unit may receive, to the unit of an image frame, the driver-captured image through one imaging means selected from a camera, a vision sensor, and a motion sensor mounted in a vehicle.

According to the present disclosure, desirably, the downsampling unit may perform the downsampling by means of a smoothing filter for decreasing the resolutions of the previous frame and the current frame to remove the motions of a given size or under.

According to the present disclosure, desirably, the active image producing unit may produce the active image through the following mathematical expression:

$$\text{Activation Map} = (R_p - R_c)^2 + (G_p - G_c)^2 + (B_p - B_c)^2$$

(wherein the $R_p$, $G_p$, and $B_p$ represent the R, G, and B values of the previous frame, respectively and the $R_c$, $G_c$, and $B_c$ represent the R, G, and B values of the current frame, respectively).

According to the present disclosure, desirably, in extracting a determination value of a central region of a window having a predetermined size, the active region extracting unit may first extract determination values of all regions of the active image, while sliding the window on the active image along a set direction, and then extract, as the active region, the window region having the biggest determination value among the determination values.

According to the present disclosure, desirably, the behavior detecting unit may input the active region extracted through the active region extracting unit to the pre-learned deep learning-based object classification algorithm, classify the driver's behavior, and detect the classified driver's behavior.

According to the present disclosure, desirably, the driver behavior detection system may further include a warning output unit for outputting at least one of a warning speech, a warning sound, and a warning light corresponding to the detected driver's behavior if the driver's behavior detected through the behavior detecting unit is one of pre-classified risky behaviors.

Advantageous Effects

The driver behavior detection system using deep learning-based object classification according to the present disclosure makes use of the fact that the driver does not move well while driving, senses the driver's behavior change from the brightness change between the frames imaged in real time, and applies the deep learning-based object classification algorithm to the region where the behavior change is sensed to detect the driver's behavior, thereby reducing the cost and time required for the object classification due to fast and accurate operating time and being easily applied to an embedded environment for a vehicle.

Further, according to the present disclosure, a driver's risky behaviors such as smartphone use, smoking, food taking, and the like, are detected while driving, and warns the driver of the risky behaviors, thereby ensuring safe driving and protecting the driver from accident risks.

DETAILED DESCRIPTION OF THE PREFERRED EMBODIMENT

Figure 1:
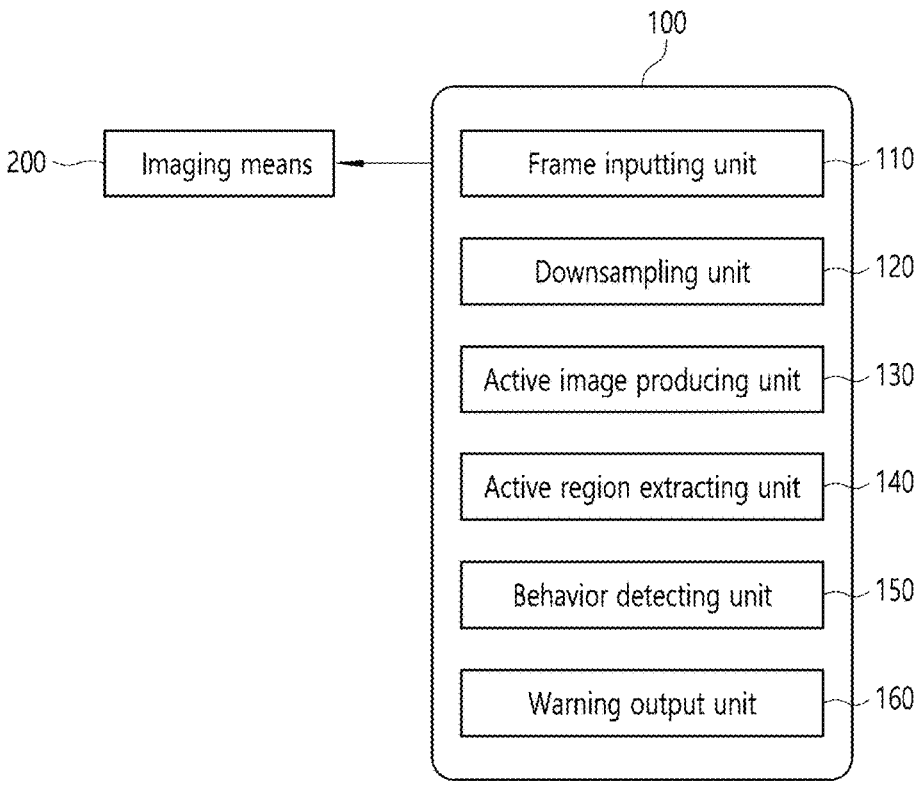
FIG. 1 is a block diagram showing a driver behavior detection system using deep learning-based object classification according to the present disclosure.

Hereinafter, an embodiment of the present disclosure will be explained in detail with reference to the attached drawings. In the description, the thicknesses of the lines or the sizes of the components shown in the drawing may be magnified for the clarity and convenience of the description.

Further, the terms as will be discussed later are defined in accordance with the functions of the present disclosure, but may be varied under the intention or regulation of a user or operator. Therefore, they should be defined on the basis of the whole scope of the present disclosure.

Now, an explanation of an embodiment of the present disclosure will be given in detail with reference to the attached drawings.

Referring to FIGS. 1 to 7, first, a driver behavior detection system using deep learning-based object classification according to the present disclosure will be explained.

FIG. 1 is a block diagram showing a driver behavior detection system using deep learning-based object classification according to the present disclosure.

As shown in FIG. 1, a driver behavior detection system 100 using deep learning-based object classification according to the present disclosure includes a frame inputting unit 110, a downsampling unit 120, an active image producing unit 130, an active region extracting unit 140, a behavior detecting unit 150, and a warning output unit 160.

The driver behavior detection system 100 according to the present disclosure may be a module of a vehicle control system or a module prepared separately therefrom in such a way as to be adopted as one of vehicle options. Further, the frame inputting unit 110, the downsampling unit 120, the active image producing unit 130, the active region extracting unit 140, the behavior detecting unit 150, and the warning output unit 160 may be configured as an integrated module or one or more modules. However, of course, the respective units may be configured as modules provided separately from one another.

Further, the driver behavior detection system 100 may be movable or fixed. For example, the driver behavior detection system 100 may be provided as the form of a server or engine and called other terms such as a device, an apparatus, a terminal, user equipment (UE), a mobile station (MS), a wireless device, a handheld device, and the like.

Further, the driver behavior detection system 100 executes or makes various software, based on an operating system (OS), that is, a system. In this case, the operating system is a system program that allows software to use the hardware of a device, which includes a mobile computer operating system such as Android OS, iOS, window mobile OS, Bada OS, Symbian OS, BlackBerry OS, and the like and a computer operating system such as Windows, Linux, Unix, MAC, AIX, HP-UX, and the like.

First, the frame inputting unit 110 receives image frames.

In this case, the frame inputting unit 110 receives, in a form of the image frames, an image capturing the driver through one imaging means 200 selected from a camera, a vision sensor, and a motion sensor mounted in a vehicle.

Figure 2:
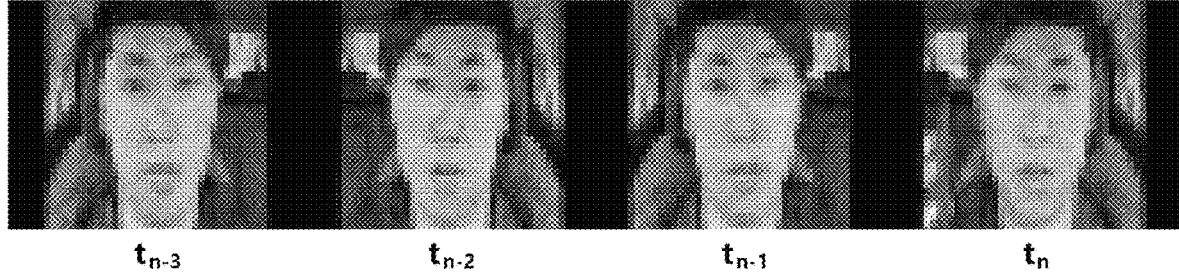
FIG. 2 shows image frames inputted to a frame inputting unit of FIG. 1.

FIG. 2 shows the image frames inputted to the frame inputting unit 110 of FIG. 1.

As shown in FIG. 2, the frame inputting unit 110 dividedly receives the image capturing the driver obtained through the imaging means 200 in a form of the image frames. In detail, the frame inputting unit 110 receives a current frame $t_n$ and a previous frame $t_{n-1}$ with respect to the current frame $t_n$ to detect the driver's behavior change.

The downsampling unit 120 serves to downsample resolutions of the previous frame and the current frame.

In this case, the downsampling unit 120 performs downsampling by means of a smoothing filter for decreasing the resolutions of the previous frame and the current frame to remove the motions of a given size or under.

Figure 3A:
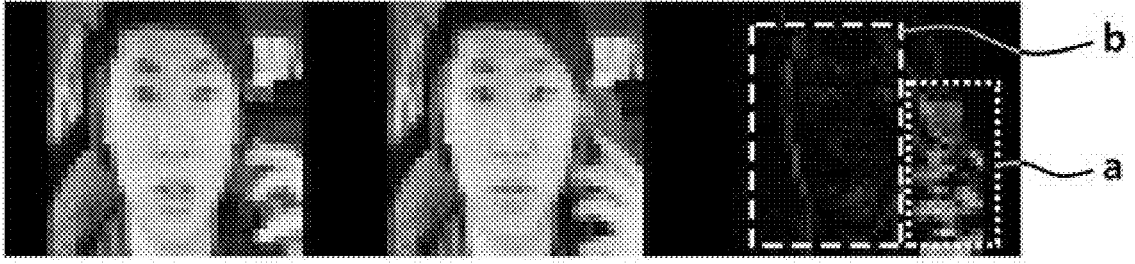
FIGS. 3A and 3B show comparison results between an example where a smoothing filter is applied and an example where a smoothing filter is not applied in the driver behavior detection system according to the present disclosure.
Figure 3B:
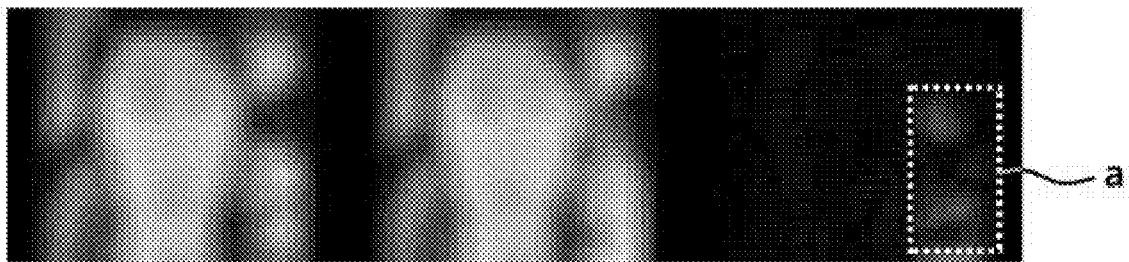

FIGS. 3A and 3B show comparison results between an example where the smoothing filter is applied and an example where the smoothing filter is not applied in the driver behavior detection system according to the present disclosure.

As shown in FIGS. 3A and 3B, the downsampling unit 120 decreases the resolutions of the previous frame and the current frame and then applies the smoothing filter to the respective images. In detail, desirably, the downsampling unit 120 applies the smoothing filter to allow a minute motion (e.g., portion b of FIG. 3A) to be removed as noise and to allow a relatively big motion (e.g., portion a of FIG. 3B) to be detected.

The active image producing unit 130 produces an active image using a brightness value for each color of the downsampled previous and current frames.

Figure 4A:
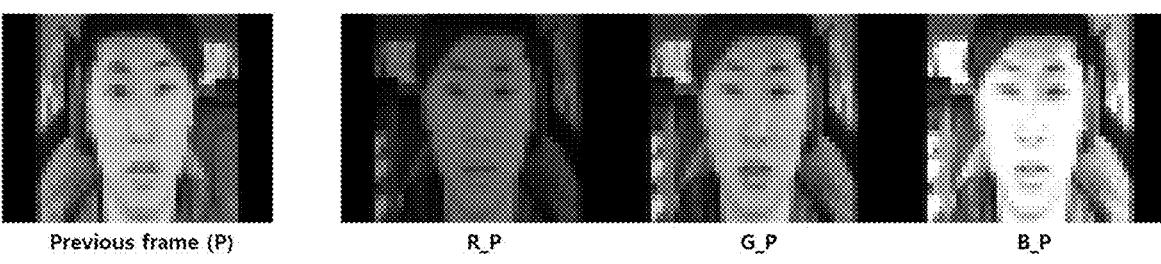
FIGS. 4A and 4B show processes in which an active image producing unit of FIG. 1 produces an active image.
Figure 4B:
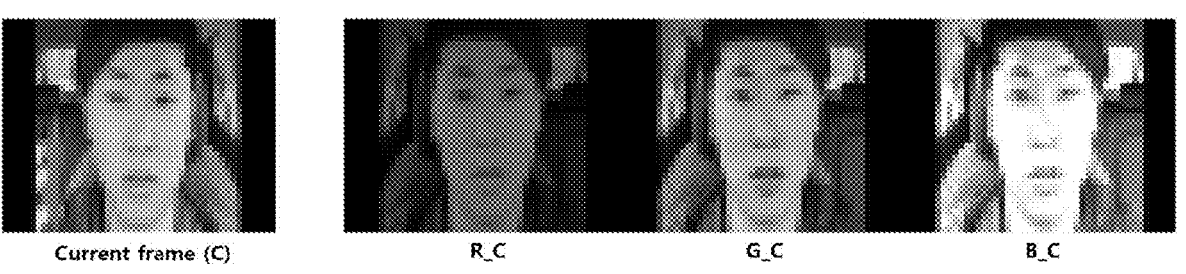

FIGS. 4A and 4B show processes in which the active image producing unit 130 of FIG. 1 produces an active image.

As shown in FIGS. 4A and 4B, the downsampled previous frame P and the downsampled current frame C are divided by R, G, and B values, respectively, and next, brightness (R, G, and B) difference values by color of the previous frame P and the current frame C and a brightness difference value of an image converted from the color image into a black and white image are added to the divided values, thereby producing the active image through the following mathematical expression.

Activation Map =                    [Mathematical expression 1]

-continued $$(R_p - R_c)^2 + (G_p - G_c)^2 + (B_p - B_c)^2$$

In this case, the $R_p$, $G_p$, and $B_p$ represent the R, G, and B values of the previous frame, respectively and the $R_c$, $G_c$, and $B_c$ represent the R, G, and B values of the current frame, respectively.

The active region extracting unit 140 applies a sliding window algorithm to the active image produced through the active image producing unit 130 to extract the active region having the biggest window value among window values.

Figure 5:
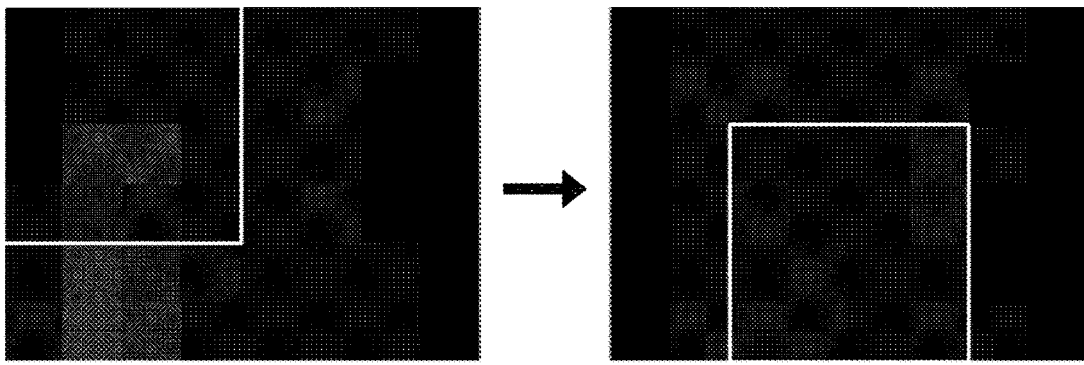
FIG. 5 shows a process in which an active region extracting unit of FIG. 1 utilizes a sliding window algorithm and thus extracts an active region.

FIG. 5 shows a process in which the active region extracting unit 140 of FIG. 1 utilizes a sliding window algorithm and thus extracts an active region.

As shown in FIG. 5, in extracting a determination value on a central region of a window having a predetermined size, the active region extracting unit 140 first extracts determination values of all regions of the active image, while sliding the window on the active image along a set direction, and then extracts, as the active region, the window region having the biggest determination value among the determination values.

In this case, the sliding window algorithm means a method for performing an operation, while moving a window having a width (w) on a list having a given length (n).

The behavior detecting unit 150 utilizes an object classification algorithm and thus classifies and detects the driver's behavior on the active region extracted through the active region extracting unit 140.

In this case, the behavior detecting unit 150 inputs the active region extracted through the active region extracting unit 140 to the pre-learned deep learning-based object classification algorithm, classifies the driver's behavior, and detects the classified driver's behavior.

In this case, deep learning is defined as a collection of machine learning algorithm for trying a high-level features through combinations of various non-linear conversion techniques, which is a field of machine learning for allowing a computer to learn a human's way of thinking.

As deep learning techniques, various techniques such as deep neural networks, convolutional deep neural networks, deep belief networks (DBN), and the like are applied to the fields of computer vision, speech recognition, natural language processing, and speech and signal processing, thereby suggesting advanced results.

Lastly, the warning output unit 160 outputs at least one of a warning speech, a warning sound, and a warning light corresponding to the detected driver's behavior if the driver's behavior detected through the behavior detecting unit 150 is one of pre-classified risky behaviors.

In this case, the risky behaviors are classified into smartphone use, smoking, food taking, and the like, while driving, and further, they include various behaviors that do not ensure safe driving. For example, if the driver's smartphone use while driving is detected, the warning output unit 160 outputs a warning speech or message like "Smartphone use while driving is risky", and otherwise, a warning sound is outputted. Further, a warning light flickers in front of the driver.

Further, the warning output unit 160 changes the volumes of the warning sound or speech or changes the number of times of flickering of the warning light according to predetermined risk levels, thereby outputting different warning levels according to the risk levels.

Figure 6:
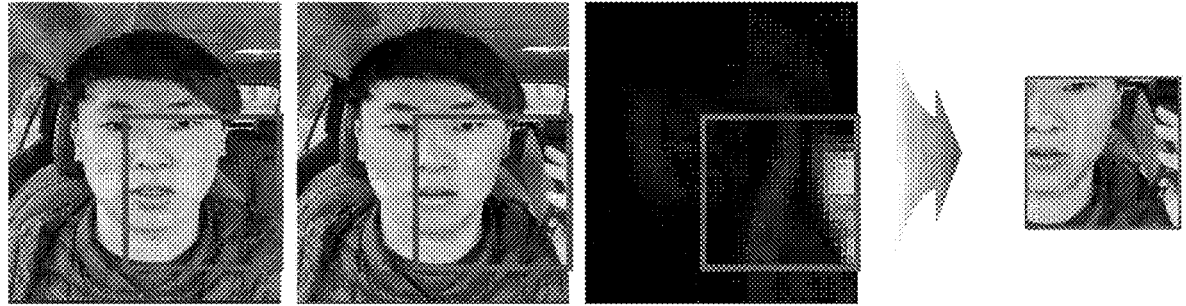
FIGS. 6 and 7 show processes of detecting a driver's behavior according to the present disclosure.
Figure 7:
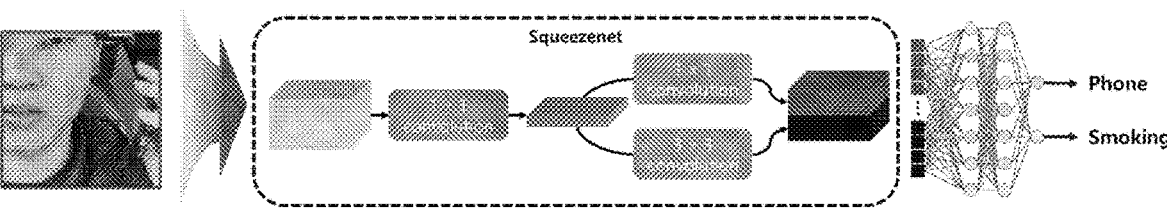

FIGS. 6 and 7 show the processes of detecting a driver's behavior according to the present disclosure.

As shown in FIG. 6, a region where the driver's behavior change occurs is extracted by using brightness change between the previous frame and the current frame, and next, as shown in FIG. 7, the extracted region is inputted to the pre-learned deep learning-based object classification algorithm, so that the driver's behavior is classified and the classified behavior is detected.

As described above, the driver behavior detection system using deep learning-based object classification according to the present disclosure makes use of the fact that the driver does not move well while driving, senses the driver's behavior change from the brightness change between the frames imaged in real time, and applies the deep learning-based object classification algorithm to the region where the behavior change is sensed to detect the driver's behavior, thereby reducing the cost and time required for the object classification due to fast and accurate operating time and being easily applied to an embedded environment for a vehicle.

Further, the driver behavior detection system using deep learning-based object classification according to the present disclosure detects the driver's risky behaviors such as smartphone use, smoking, food taking, and the like, while driving, and warns the driver of the risky behaviors, thereby ensuring safe driving and protecting the driver from accident risks.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

| [Explanation of Reference Numerals] |
| --- |
| 100: driver behavior detection system |
| 110: frame inputting unit |
| 120: downsampling unit |
| 130: active image producing unit |
| 140: active region extracting unit |
| 150: behavior detecting unit |
| 160: warning output unit |
| 200: imaging means |

What is claimed is:

1. A driver behavior detection system using deep learning-based object classification, the driver behavior detection system comprising:

a frame inputting processor configured to receive image frames including a previous frame and a current frame;

a downsampling processor configured to downsample a resolution of each of the previous frame and the current frame of the image frames by using a smoothing filter to remove motions of a predetermined size or under;

an active image producing processor configured to utilize a brightness value for each color of the previous frame and the current frame that are downsampled to produce an active image;

an active region extracting processor configured to:

apply a sliding window algorithm to the produced active image and slide a window on the active image along a predetermined direction, extract window values for all window regions of the active image, and extract, as an active region, a window region having a biggest window value among window values; and a behavior detecting processor configured to apply an object classification algorithm to the extracted active region to classify and detect a behavior of a driver, wherein the active image producing processor is configured to produce the active image through a following mathematical expression:

$$\text{Activation Map} = (R_p - R_c)^2 + (G_p - G_c)^2 + (B_p - B_c)^2$$

wherein the $R_p$, $G_p$, and $B_p$ denote R, G, and B values of the previous frame, respectively and the $R_c$, $G_c$, and $B_c$ denote R, G, and B values of the current frame, respectively.

2. The driver behavior detection system according to claim 1, wherein the frame inputting processor is configured to receive the image frames of an image capturing the driver, from at least one imaging mean selected from a camera, a vision sensor, or a motion sensor mounted in a vehicle.

3. The driver behavior detection system according to claim 1, wherein the behavior detecting processor is configured to input the active region extracted to a pre-learned deep learning-based object classification algorithm, to classify the behavior of the driver, and to detect the behavior of the driver that is classified.

4. The driver behavior detection system according to claim 1, further comprising a warning output processor configured to output at least one selected from a warning speech, a warning sound, or a warning light corresponding to the detected behavior of the driver if the behavior of the driver detected through the behavior detecting processor is one of pre-classified risky behaviors.

5. The driver behavior detection system according to claim 4, wherein the warning output processor is configured to change volumes of the warning speech or the warning sound and a number of flickering of the warning light according to predetermined risk levels, thereby outputting different levels of warnings according to different risk levels.

* * * * *